United States Patent [19]

Kato et al.

[11] Patent Number: 4,885,125

[45] Date of Patent: Dec. 5, 1989

[54] METHOD FOR IN-MOLD POLYMERIZATION OF UNSATURATED COMPOUND

[75] Inventors: Yasuyuki Kato; Masahiro Yuyama; Masahiko Moritani, all of Ehime; Yukio Yasunori, Osaka, all of Japan

[73] Assignee: Sumitomo Chemical Company, Limited, Osaka, Japan

[21] Appl. No.: 900,974

[22] Filed: Aug. 27, 1986

[30] Foreign Application Priority Data

Aug. 28, 1985 [JP] Japan .................................. 60-190598

[51] Int. Cl.⁴ ........................ B29C 39/42; B29C 39/44
[52] U.S. Cl. .................................. 264/328.6; 264/1.1; 264/331.18; 264/337; 525/263; 525/308; 525/329.7
[58] Field of Search .......... 264/216, 331.18, DIG. 83, 264/328.6, 1.1, 337; 525/263, 308, 329.7

[56] References Cited

U.S. PATENT DOCUMENTS

| | | | |
|---|---|---|---|
| 3,647,737 | 3/1972 | Dowbenko et al. | 525/308 X |
| 3,827,933 | 8/1974 | Duggins et al. | 264/331.18 X |
| 3,843,612 | 10/1974 | Vogel et al. | 264/331.18 X |
| 3,966,693 | 6/1976 | Kato | 264/331.18 X |
| 4,089,918 | 5/1978 | Kato et al. | 264/216 X |
| 4,133,861 | 1/1979 | Kato | 264/216 |
| 4,174,311 | 11/1979 | Nakano et al. | 526/530 |
| 4,259,462 | 3/1981 | Nakano et al. | 525/263 |
| 4,477,405 | 10/1984 | Makhlouf et al. | 264/250 |
| 4,554,301 | 11/1985 | Dohl et al. | 525/263 X |

FOREIGN PATENT DOCUMENTS

| | | | |
|---|---|---|---|
| 52-35393 | 9/1977 | Japan. | |
| 53-30985 | 8/1978 | Japan. | |
| 471882 | 12/1935 | United Kingdom | 264/331.18 |
| 518220 | 2/1940 | United Kingdom | 264/331.18 |
| 738487 | 10/1955 | United Kingdom | 264/331.18 |

OTHER PUBLICATIONS

Kubiak, Richard S. and Robert C. Harper "The Development of Non-Urethane Materials for the Rim Process" in the *45th Annual Technical Conference, Reinforced Plastics/Composites Institute, The Society of the Plastics Industry, Inc.* [1980] Section 22-C, pp. 1-6 copy: 264-328.6.

Primary Examiner—Philip Anderson
Attorney, Agent, or Firm—Birch, Stewart, Kolasch & Birch

[57] ABSTRACT

An unsaturated compound having a vinyl or vinylidene group is rapidly in-mold polymerized by mixing the unsaturated compound containing a polymerization initiator and the unsaturated compound containing a polymerization accelerator, pouring the mixture into a mold cavity and polymerizing the monomer for not longer than 30 minutes.

19 Claims, 1 Drawing Sheet

METHOD FOR IN-MOLD POLYMERIZATION OF UNSATURATED COMPOUND

BACKGROUND OF THE INVENTION

1. Field of the Invention

The present invention relates to a method for inmold polymerization of an unsaturated compound having a vinyl or vinylidene group (hereinafter referred to as "vinyl type monomer"). More particularly, the present invention relates to a method for in-mold polymerization of a vinyl type monomer comprising mixing the vinyl type monomer optionally containing its polymer with a polymerization initiator and a polymerization accelerator in a specific manner and rapidly polymerizing and molding it in a mold to produce a molded article with good efficiency.

2. Background of the Invention

In general, a vinyl or vinylidene polymer (hereinafter referred to as "vinyl type polymer") is molded by melt molding, for example, injection molding comprising melting a polymer in the form of powder, beads or pellets at a high temperature and injecting molten polymer in a mold.

For producing a sheet material of polymethyl methacrylate, there are known a cell casting method which comprises pouring methyl methacrylate optionally containing its polymer into a cell made of glass plates and gradually polymerizing methyl methacrylate for a long period of time, for example, several hours and a continuous casting method comprising casting an unsaturated monomer comprising methyl methacrylate containing its polymer on an endless metal belt and polymerizing it in a comparatively short period of time (cf. Japanese Patent Publication Nos. 30985/1977 and 35393/1977).

When the vinyl type polymer is melt molded, for example, by injection molding, it should be molded in a narrow temperature range in which the polymer is molten but not thermally decomposed since the polymer tends to be thermally decomposed at a high temperature and pressure required for melt molding. Therefore, the melt molding of the vinyl type polymer requires a large amount of energy and a large complicated apparatus. In addition, even at a high temperature, the molten vinyl type polymer has very high viscosity so that great skill is required to transfer surface images of the mold to the molded article precisely.

The cell casting is not generally employed except for molding the plate form article since a polymerization rate in this method cannot be increased, this resulting in poor productivity. Although the continuous coasting method has good productivity, it requires an expensive apparatus but can produce only a plate form article.

In these conventional methods, all the components including the monomer and the polymerization initiator are mixed together and poured in a reaction cavity to polymerize the monomer. In a case of a polymerization initiator providing a high polymerization rate, the polymerization reaction does not proceed homogeneously.

SUMMARY OF THE INVENTION

One object of the present invention is to provide a method for producing a precise molded article of the vinyl type polymer with good efficiency by using a comparatively small amount of energy and simple apparatus.

Another object of the present invention is to provide a method for rapid in-mold polymerization of the vinyl type monomer.

These and other objects of the present invention are accomplished by a method for in-mold polymerization of a vinyl type monomer comprising mixing the monomeric compound containing a polymerization initiator and the monomeric compound containing a polymerization accelerator, pouring the mixture into a mold cavity and polymerizing the monomer not longer than 30 minutes.

The present invention will become more fully understood from the detailed description given hereinbelow and the accompanying drawing which is given by way of illustration only and wherein:

FIG. 1 is a schematic diagram of an apparatus for the inmold polymerization process of the present invention.

DETAILED DESCRIPTION OF THE INVENTION

Figure 1:
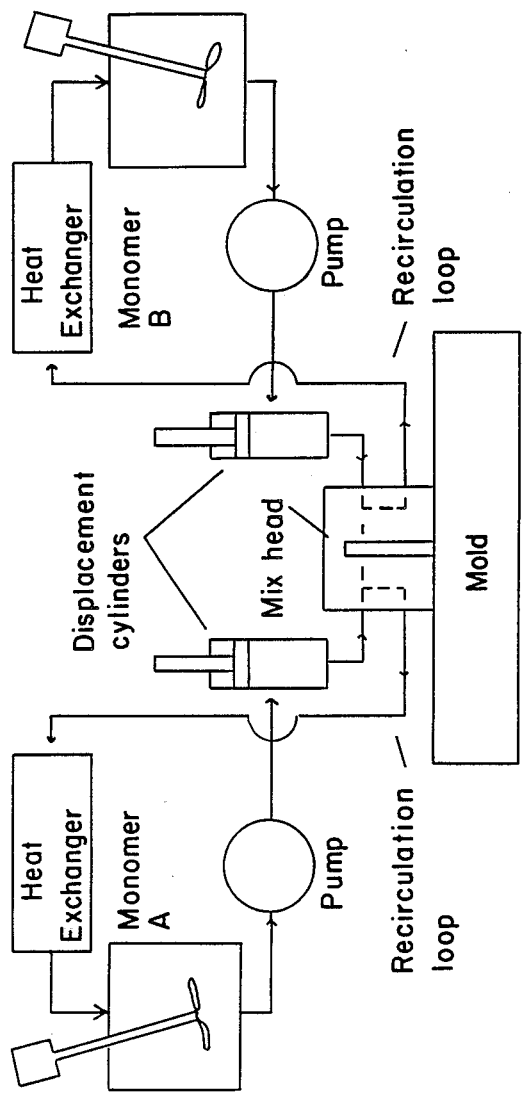

Examples of the vinyl type monomer to be polymerized by the method of the invention are methacrylate or acrylate of a $C_1$–$C_{25}$ aliphatic, alicyclic or aromatic alcohol or phenol (e.g., methyl methacrylate, ethyl methacrylate, butyl methacrylate, phenyl methacrylate, benzyl methacrylate, cyclohexyl methacrylate, bornyl methacrylate, isobornyl methacrylate, methyl acrylate, ethyl acrylate, butyl acrylate, phenyl acrylate, benzyl acrylate, cyclohexyl acrylate, bornyl acrylate and isobornyl acrylate); vinylnitriles (e.g., acrylonitrile, methcrylonitrile and crotonitrile); vinyl esters (e.g., vinyl acetate, vinyl propionate and vinyl benzoate); methacrylic acid; and acrylic acid. Among them, methacrylates are preferred because of their good reactivity.

Although the monomer may be used alone, it can be used as a mixture with at least one of other monomers to improve characteristics of the polymer produced and/or increase reactivity of the monomers.

In addition, at least one of other copolymerizable monomer such as styrene, α-methylstyrene, p-methylstyrene, maleic anhydride and the like may be used together with the above monomer(s).

Although the monomer as such can be polymerized, it is preferred to polymerize the monomer containing its polymer, namely so-called a "syrup" due to improvement of polymerization activity and easy handling. The content of the polymer in the syrup is usually from 3 to 40% by weight. When the polymer content in the syrup is larger than 40% by weight, the syrup has too large a viscosity so that the handling of the syrup is difficult.

The syrup may be prepared by a per se conventional method. For example, the polymerization of the monomer is initiated by the addition of a polymerization initiator and terminated when conversion reaches a certain level, or an adequate amount of the polymer is dissolved in the monomer.

As the polymerization initiator, a radical polymerization initiator is preferably used, although other initiators may be used. Among the, peroxide type radical initiators are preferred. In view of the stability of the monomer containing the polymerization initiator and optionally the polymer, preferred is an initiator having a half life of 10 hours at a temperature not lower than 50° C. and preferably not lower than 60° C. Examples of the radical polymerization initiator are dialkyl peroxides (e.g., di-t-butyl peroxide, t-butyl cumyl peroxide and dicumyl peroxide); diacyl peroxide (e.g., lauroyl peroxide, benzoyl peroxide and succinic acid peroxide); peroxy esters (e.g., t-butyl peroxyacetate, t-butyl peroxybenzoate, t-butyl peroxypivalate and t-butyl peroxylaurate); hydroperoxides (e.g., t-butyl hydroperoxide and cumene hydroperoxide); and ketone peroxides (e.g., methyl ethyl ketone peroxide), and mixtures thereof.

The amount of the initiator is from 0.05 to 5 parts by weight, preferably from 0.5 to 2 parts by weight, per 100 parts by weight of the monomer optionally containing the polymer.

When the amount of the initiator is less than 0.05 parts by weight, the polymerization does not completely proceed. When it is larger than 5 parts by weight, control of the polymerziation is difficult and the produced polymer has inferior weather and heat resistances.

As the polymerization accelerator, a compound which decomposes the polymerization initiator and accelerates the formation of radicals such as a reductant is preferably used.

As the reductant, used is a c ompound soluble in the vinyl type monomer, for example, mono-, di-, tri-, or tetra-valent sulfuric compounds such as sulfinates (e.g., methyl p-toluenesulfinate and ethyl p-toluenesulfinates), thioureas (e.g., tetramethylthiourea and dibutylthiourea), mercaptans (e.g., laurylmercaptan, t-dodecylmercaptan, octylmercaptan, butylmercaptan, 2-ethylhexylmercaptan, 2-ethylhexyl thioglycolate, pentaerythritol tetrathioglycolate, glycol dimercaptoacetate, 2-mercaptoethanol and its esters, $\beta$-mercaptopropionic acid and its esters); tertiary amines (e.g., N,N-dimethylaniline, N,N-dimethyl-p-toluidine and N,N-di-(2-hydroxypropyl)-p-toluidine); trivalent phosphorous compounds such as phosphites (e.g., trimethyl phosphite, triethyl phosphite and tri-n-butyl phosphite) and the like.

The reductant is used in an amount of 0.05 to 5 parts by weight, preferably 0.5 to 2 parts by weight, per 100 parts by weight of the monomer optionally containing the polymer. When the amount used is less than 0.05 parts by weight, the polymerization rate is not sufficiently increased. When it is larger than 5 parts by weight, the produced polymer is colored and/or its strength is deteriorated.

As an auxiliary component for the polymerization accelerator, a heavy metal containing compound and a hydrogen halogenide salt of an amine or a quarternary ammonium halogenide may be used. These compounds further accelerate the polymerization reaction.

As the heavy metal containing compound, exemplified is a compound of at least one metal selected from the group consisting of iron, copper and cobalt which is soluble in the vinyl type monomer. Specific examples are naphthenates and acetylacetonates of these metals.

The amount of the heavy metal containing compound to be added is 0.005 to 10 ppm, preferably 0.1 to 5 ppm in terms of the metal amount per weight of the vinyl type monomer. When the amount is less than 0.005 ppm, the polymerization is not effectively accelerated. When it is larger than 10 ppm, the polymerization initiator is inactivated so that the polymerization is inhibited.

As the hydrogen halogenide salt of amine or the quarternary ammonium halogenide, exemplified are hydrogen chloride salts or hydrogen bromide salts of amine (e.g., n-amylamine, n-hexylamine, n-octaylmaine, n-decylamine, laurylamine, palmitylamine, dibutylamine, tributylamine, N,N-dimethylbenzylamine, N,N-dimethyl-p-toluidine, phenethyldibutylamine, N,N,N',N'-tetramethylhexamethylenediamine, N,N,N',N'-tetramethylpropyldiamine,N,N-diethylbenzylamine, N,N-dibutylbenzylamine and phenethyldiethylamine); and tetramethylammonium chloride, benzyltrimethylammonium chloride, benzyltyriethylammonium chloride, benzyltributylammonium chloride, trioctylmethylammonium chloride and $\beta$-phenethyldibutylethoxycarbonylmethylammonium chloride. These compounds may be used in an amount of 0.005 to 1 parts by weight, preferably 0.01 to 0.5 parts by weight, per 100 parts by weight of the vinyl monomer optionally containing the polymer. When the amount is less than 0.005 parts by weight or larger than 1 parts by weight, the polymerization is not accelerated effectively.

These compounds may be used as such when they are soluble in the monomer, or in the form of a solution in a suitable solvent (e.g., isopropanol, dimethylphthalate, diethylene glycol and the like) when it is insoluble in the monomer.

According to the present invention, the monomer containing the polymerization initiator and optionally the corresponding polymer and the monomer containing the polymerization accelerator are mixed to initiate the polymerization.

To rapidly proceed and complete the polymerization of the vinyl type monomer, the initiator and other additives with high polymerization activities are used. Therefore, when the initiator and other additives are added individually to the same portion of the monomer, it is sometimes very difficult to mix them uniformly within a short time and to conduct the polymerization reaction homogeneously.

According to the method of the present invention, the monomer and the additive components including the polymerization initiator and the like are homogeneously mixed in a short time so that the reaction proceeds homogeneously. The auxiliary components for the polymerization accelerator may be added to either one of the two monomer portions.

The mixing of the two monomer portions is preferably carried out at a temperature not higher than 50° C. for 10 minutes or less.

When the mixing temperature is higher than 50° C., the polymerization is unfavorably partially initiated and proceeds during mixing. When the mixing time is too long, the polymerization proceeds during mixing and pouring. As far as the monomer portions are thoroughly mixed, the shorter mixing time is the better.

In the case of molding a small article, the monomer portions may be mixed batch wise and poured in the mold cavity. However, this procedure is not suitable for molding a large article. Preferably, the monomer portions are continously mixed and poured into the mold cavity, since the monomer and the additives are homogeneously mixed and a large article can be produced. In any case, a time from the mixing of the monomer to pouring it into the mold cavity should be as short as possible.

The mixing can be carried out by a per se conventional method, for example, by means of a collision type mixer, a dynamic mixer and static mixer.

In comparison with the conventional molding method in which a molten resin is poured in the mold cavity, the method of the present invention requires a comparatively low injection pressure since the vinyl type monome which is used as a molding material has lower viscosity than the molten resin. Therefore, the volume of the mold cavity can vary from a small one to a large one. The mold may be made of metal, resin, elastomer or wood. Among them, a metal mold is preferred due to its preciseness and durability.

The temprature of the mold can be controlled by a heater embedded in the mold wall, air cooling, or a jacket or a conduit provided within the mold wall through which a heat transfer medium such as water or oil is passed.

The polymerization time in the method of the present invention varies with the kinds and amounts of the polymerization initiator and/or other additives, the mold temperature and the like and is usually not longer than 30 minutes, preferably not longer than 15 minutes, more preferably not longer than 10 minutes.

The method of the present invention may be used to produce any molded article made of the vinyl type polymer. That is, by changing the shape and size of the mold cavity, any molded article can be produced by the method of the present invention.

Particularly, the method of the present invention is suitable for producing optical parts since the molded article has significantly less internal strain. The optical parts include conventional lenses, Fresnel lenses, optical recording disc media, prisms and millers. Among them, the Fresnel lenses (which are required to have a precise shape) are preferably produced by the method of the present invention, since the precise image of the mold can be transferred to the produced polymer according to the present invention.

Since a large size article also can be molded by the method of the present invention, automobile parts such as a plate for a front window, a sun roof, a side window and rear window, a sign board, a water tank panel and a bathtub are produced.

According to the present invention, the vinyl type polymer can be molded at a much lower temperature and pressure than in the conventional methods, and the surface image of the mold cavity can be precisely transferred to the molded article more easily than by the conventional methods. In addition, the molded article of the vinyl type polymer can be produced in a shorter time than by a conventional cast polymerization method.

EXAMPLES

Presently and practically preferred embodiments of the present invention will be illustrated by following examples, in which a haze value and Rockwell hardness are measured according to ASTM D 790 and ASTM D 785, respectively.

EXAMPLE 1

Preparation of a Raw Syrup

To a stainless steel vessel, methyl methacrylate resin (SUMIPEX (trade mark) B MH Manufactured by Sumitomo CHemical) (2 kg) and methyl methacrylate monomer (8 kg) were added and stirred for 24 hours to prepare a raw syrup, which was a viscous liquid having a viscosity of one poise.

Preparation of Syrup A

In the raw syrup (1,000 g) charged in a 2 liter stainless steel vessel, an 8% by weight solution of dibutylamine hydrogen chloride in diethyleneglycol (12.5 g) and t-butyl peroxybenzoate (10 g) were added and dissolved to prepare Syrup A.

Preparation of Syrup B

In the raw syrup (1,000 g) charged in a 2 liter stainless steel vessel, 2-mercaptoethanol (4 g) and a 1% by weight solution of copper naphthenate (Cu content, 10%) in methyl methacrylate (0.4 g) were mixed and dissolved to prepare Syrup B.

When Syrups A and B were stored at a room temperature (25° C.), their viscosities were not substantially changed and remained in a usable range after one day.

Syrup A (300 g) and Syrup B (300 g) were pumped in a dynamic mixer and mixed at a room temperature, (25° C.) with an average mixing time of 30 seconds. Then, the mixture was poured into a mold (350×350×3 mm) kept at 55° C. After 6.8 minutes from the completion of pouring, the polymerization temperature reached a maximum. After 8 minutes, the molded polymer was removed from the mold to obtain a molded article, which had haze value of 1.0% and Rockwell hardness of 97 (M scale) as well as good gloss.

EXAMPLE 2

Syrup A (300 g) and Syrup B (300 g) prepared in Example 1 were separately supplied from two tanks at the same rate to the mixer with an average mixing time of 2 minutes. The mixture was immediately poured into a mold (350×350×4 mm) ketp at 85° C. After 2 minutes from the completion of pouring, the mold containing the mixture was cooled to obtain polymethyl methacrylate, which was homogeneous, transparent and had good surface hardness and gloss.

EXAMPLE 3

Preparation of a Raw Syrup

To a reactor, methyl methacrylate (560 g), methyl acrylate (140 g) and azobisisobutylonitrile (0.07 g) were added and partially polymerized with gentle stirring at 80° C. When the viscosity of the reaction mixture reached about one poise, the vessel was cooled with iced water to obtain a raw syrup having a viscosity of 2 poise.

Preparation of Syrup A'

In the raw syrup (300 g) charged in an egg plant type 500 ml glass flask, ethyleneglycol dimethacrylate (9 g) and benzoyul peroxide (12 g) were added and dissolved to obtain Syrup A'.

Preparation of Syrup B'

In the raw syrup (300 g) charged in an egg plant type 500 ml glass flask, ethyleneglyocl dimethacrylate (9 g), 2-ethylhexyl thioglycolate (0.3 g) and N,N-dimethylaniline (6 g) were added and dissolved to obtain Syrup B'.

Syrups A' and B' were charged and mixed in the mixer with an average mixing time of 30 seconds. Then, the mixture was poured into a mold (350×350×4 mm) kept at 80° C. After 4 minutes from the completion of the pouring, the polymerization temperature reached a maximum. After 8 minutes from the completion of the pouring, the polymer was removed from the mold to obtain a molded article, which had no bubble, good gloss, haze value of 1.2% and Rockwell hardness of 97 (M scale).

Comparative Example 1
The following components were thoroughly mixed:

| Raw syrup of Example 1 | 600 g |
|---|---|
| t-Butyl peroxybenzoate | 3 g |
| Dibutylamine hydrogen chloride | 0.3 g |
| Diethyleneglycol | 3 g |
| 2-Mercaptoethanol | 1.2 g |
| Copper naphthenate ($Cu^{2+}$, 10%) | 0.001 g |

The mixture was poured in a mold (350×250×3 mm) kept at 85° C. The polymer produced had unhomogeneous transparency and many bubbles therein.

The residual mixture had poor storability so that it was polymerized at a room temperature (25° C.) after 60 minutes with vigorous heat development.

What is claimed is:

1. A method for in-mold polymerization of an unsaturated compound having a vinyl or vinylidene group comprising:
   continuously mixing one portion of an unsaturated monomer compound containing a polymerization initiator and another portion of an unsaturated monomer compound containing a polymerization accelerator;
   continuously pouring the mixed monomer portions into a mold cavity; and
   polymerizing the monomer portion for not longer than 10 minutes.

2. The method according to claim 1, wherein the unsaturated monomer compound comprises at least one compound selected from the group consisting of methacrylates and acrylates.

3. The method according to claim 1, wherein the mold is kept in a temperature range between 50° and 150° C.

4. The method according to claim 1, wherein the polymerization initiator is a peroxide type radical polymerization initiator, and the polymerization accelerator is a reductant.

5. The method according to calim 1, wherein the unsaturated monomer compound contains its polymer.

6. The method according to claim 5, wherein the content of the polymer in the unsaturated monomer compound is from 3 to 40% by weight.

7. The method according to claim 1, wherein the monomer to be polymerized is a member selected from the group consisting of a monomer of methacrylate or acrylate of a $C_1$–$C_{25}$ aliphatic alicyclic or aromatic alcohol or phenol; vinyl nitriles; vinyl esters; methacrylic acid; and acrylic acid.

8. The method according to claim 7, wherein the monomer to be polymerized is a member selected from the group consisting of methyl methacrylate, ethyl methacrylate, butyl methacrylate, phenyl methacrylate, benzyl methacrylate, cyclohexyl methacrylate, bornyl methacrylate, isobornyl methacrylate, methyl acrylate, ethyl acylate, butyl acrylate, phenyl acrylate, benzyl acrylate, cyclohexyl acrylate, bornyl acrylate and isobornyl acrylate.

9. The method according to claim 7, wherein the monomer to be polymerized is a member selected from the group consisting of acrylonitrile and methacrylonitrile.

10. The method according to claim 7, when the monomer to be polymerized is selected form the group consisting of vinyl acetate, vinyl propionate, and vinyl benzoate.

11. The method according to claim 1, wherein at least one other copolymerizable monomer is used with the monomer to be polymerized.

12. The method according to claim 11, wherein the copolymerizable monomer is a member selected from the group consisting of styrene, α-methylstyrene, p-methylstyrene, and maleic anhydride.

13. The method according to claim 1, wherein the radical polymerization initiator is a member selected from the group consisting of dialkyl perioxides, diacyl peroxides, peroxy esters, hydroperoxides, and ketone peroxides, and mixtures thereof.

14. The method according to claim 1, wherein the radical polymerization initiator is present in an amount of from 0.05 to 5 parts by weight per 100 parts by weight of the monomer optionally containing the polymer.

15. The method according to claim 1, wherein the polymerization accelerator is a member selected from the group consisting of sulfinates, thioureas, mercaptans, tertiary amines, and trivalent phosphorous compounds.

16. The method according to claim 1, wherein the polymerization accelerator is used in an amount of 0.05 to 5 parts by weight per 100 parts by weight of the monomer optionally containing the polymer.

17. The method according to claim 1, wherein said polymerization accelerator contains an auxiliary component selected from the group consisting of a heavy metal containing compound and a hydrogen halogenide salt of an amine or quaternary ammonium halogenide.

18. The method according to claim 1, wherein the portion of said unsaturated monomer compound containing the polymerization initiator is separate from the portion of said unsaturated monomer compound containing the polymerization accelerator.

19. The method according to claim 1, wherein pouring of the mixed monomer portions into said mold cavity occurs immediately after said portions are mixed.

* * * * *